(12) United States Patent
Murakami et al.

(10) Patent No.: US 12,403,793 B2
(45) Date of Patent: Sep. 2, 2025

(54) SOLAR CHARGING SYSTEM

(71) Applicant: TOYOTA JIDOSHA KABUSHIKI KAISHA, Toyota (JP)

(72) Inventors: Yukinori Murakami, Toyota (JP); Yuma Miyamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 18/464,333

(22) Filed: Sep. 11, 2023

(65) Prior Publication Data

US 2024/0174128 A1 May 30, 2024

(30) Foreign Application Priority Data

Nov. 24, 2022 (JP) ................. 2022-187610

(51) Int. Cl.
| | |
|---|---|
| *B60L 58/18* | (2019.01) |
| *B60L 1/02* | (2006.01) |
| *B60L 1/14* | (2006.01) |
| *B60L 8/00* | (2006.01) |
| *H02S 10/20* | (2014.01) |

(52) U.S. Cl.
CPC ............. *B60L 58/18* (2019.02); *B60L 1/02* (2013.01); *B60L 1/14* (2013.01); *B60L 8/003* (2013.01); *H02S 10/20* (2014.12)

(58) Field of Classification Search
None
See application file for complete search history.

(56) References Cited

U.S. PATENT DOCUMENTS

| | | | | |
|---|---|---|---|---|
| 3,971,454 | A  * | 7/1976 | Waterbury | B60K 1/04 |
| | | | | 180/2.2 |
| 8,347,999 | B2 * | 1/2013 | Koelsch | B60L 8/003 |
| | | | | 180/165 |
| 11,539,230 | B2 * | 12/2022 | Tian | H01M 10/0525 |
| 2010/0213887 | A1 * | 8/2010 | Louch | H02J 7/35 |
| | | | | 320/101 |
| 2011/0241604 | A1 * | 10/2011 | Anderson | B60L 53/52 |
| | | | | 136/246 |
| 2012/0217809 | A1 * | 8/2012 | Sato | H02J 9/062 |
| | | | | 307/64 |

(Continued)

FOREIGN PATENT DOCUMENTS

| | | |
|---|---|---|
| JP | 2019-092314 A | 6/2019 |
| JP | 2021-083248 A | 5/2021 |

*Primary Examiner* — Daniel L Greene
(74) *Attorney, Agent, or Firm* — SoraIP, Inc.

(57) ABSTRACT

A solar charging system mounted on a vehicle includes a power generation module using a solar panel, an auxiliary system including an auxiliary machine battery for storing electric power generated by the power generation module and an auxiliary machine load to which electric power is supplied from the auxiliary machine battery, a high-voltage battery used for driving the vehicle, and a control unit provided between the high-voltage battery and the auxiliary system and controlling power transfer between the high-voltage battery and the auxiliary system. In a case where power transfer from the high-voltage battery to the auxiliary system is requested, when the power generated by the power generation module is not supplied to the auxiliary system, the control unit supplies power of the high-voltage battery to the auxiliary system.

2 Claims, 5 Drawing Sheets

(56) References Cited

U.S. PATENT DOCUMENTS

| | | | |
|---|---|---|---|
| 2014/0114517 A1* | 4/2014 | Tani | B60W 20/13 |
| | | | 903/903 |
| 2014/0116077 A1* | 5/2014 | Pierce | F25B 27/002 |
| | | | 219/202 |
| 2017/0145977 A1* | 5/2017 | Toyama | B60L 58/14 |
| 2019/0143835 A1 | 5/2019 | Hirano | |
| 2020/0130525 A1* | 4/2020 | Son | H02J 7/35 |
| 2021/0155109 A1 | 5/2021 | Miyamoto et al. | |
| 2022/0348088 A1* | 11/2022 | Gage | B60L 53/20 |
| 2025/0007451 A1* | 1/2025 | Srnec | B60R 16/03 |

\* cited by examiner

SOLAR CHARGING SYSTEM

CROSS-REFERENCE TO RELATED APPLICATION

This application claims priority to Japanese Patent Application No. 2022-187610 filed on Nov. 24, 2022, incorporated herein by reference in its entirety.

BACKGROUND

1. Technical Field

The present disclosure relates to a solar charging system that controls supply of power generated by a solar panel mounted on a vehicle.

2. Description of Related Art

The solar charging system disclosed in Japanese Unexamined Patent Application Publication No. 2021-083248 (JP 2021-083248 A) supplies power from a solar panel to an auxiliary system to derive power actually generated by the solar panel, when the solar panel is in a state of being able to generate power. When the derived actual generated power is equal to or greater than a specified value, the solar charging system further charges a high-voltage battery with the power generated by the solar panel.

SUMMARY

When a vehicle is in a non-operating state (e.g., a parked state, etc.), a pump-up charge process may be performed to suppress an auxiliary battery that supplies power to equipment that operates a service provided while the vehicle is parked, from running out. The pump-up charge process is a process of transferring power of a high-voltage battery to the auxiliary battery. The pump-up charge process is typically performed via a direct current (DC)-DC converter that controls electric power of the vehicle.

However, the DC-DC converter is typically designed to be suitable for transferring a large amount of power from the high-voltage battery to the auxiliary battery when the vehicle is in an operating state. For this reason, there is an issue that energy conversion efficiency is low in the transfer of a small amount of power as in the pump-up charge process while the vehicle is parked. Therefore, there is room for further study on a charging method of the power generated by the solar panel to be implemented in the solar charging system.

The present disclosure is made in view of the above issue, and an object of the present disclosure is to provide a solar charging system capable of improving energy conversion efficiency of a DC-DC converter in a pump-up charge process.

In order to solve the above issue, an aspect of the technique of the present disclosure is a solar charging system mounted on a vehicle. The solar charging system includes: a power generation module including a solar panel; an auxiliary system including an auxiliary battery that stores power generated by the power generation module, and an auxiliary load to which power is supplied from the auxiliary battery; a control unit that is provided between a high-voltage battery used for driving a vehicle and the auxiliary system and that controls power transfer between the high-voltage battery and the auxiliary system. In a case where power transfer from the high-voltage battery to the auxiliary system is requested, when the power generated by the power generation module is not supplied to the auxiliary system, the control unit supplies power of the high-voltage battery to the auxiliary system.

With the solar charging system of the present disclosure, it is possible to improve the energy conversion efficiency of the DC-DC converter in the pump-up charge process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The solar charging system according to the present disclosure supplies the power of the high-voltage battery to the auxiliary system when the generated power of the power generation module is not supplied to the auxiliary system (the auxiliary battery and the auxiliary load). As a result, a large amount of electric power can be taken out of the high-voltage battery to the auxiliary system, so that the energy-conversion efficiency of DC-DC converters can be improved. Hereinafter, an embodiment of the present disclosure will be described in detail with reference to the drawings.

EMBODIMENT

Configuration

Figure 1:
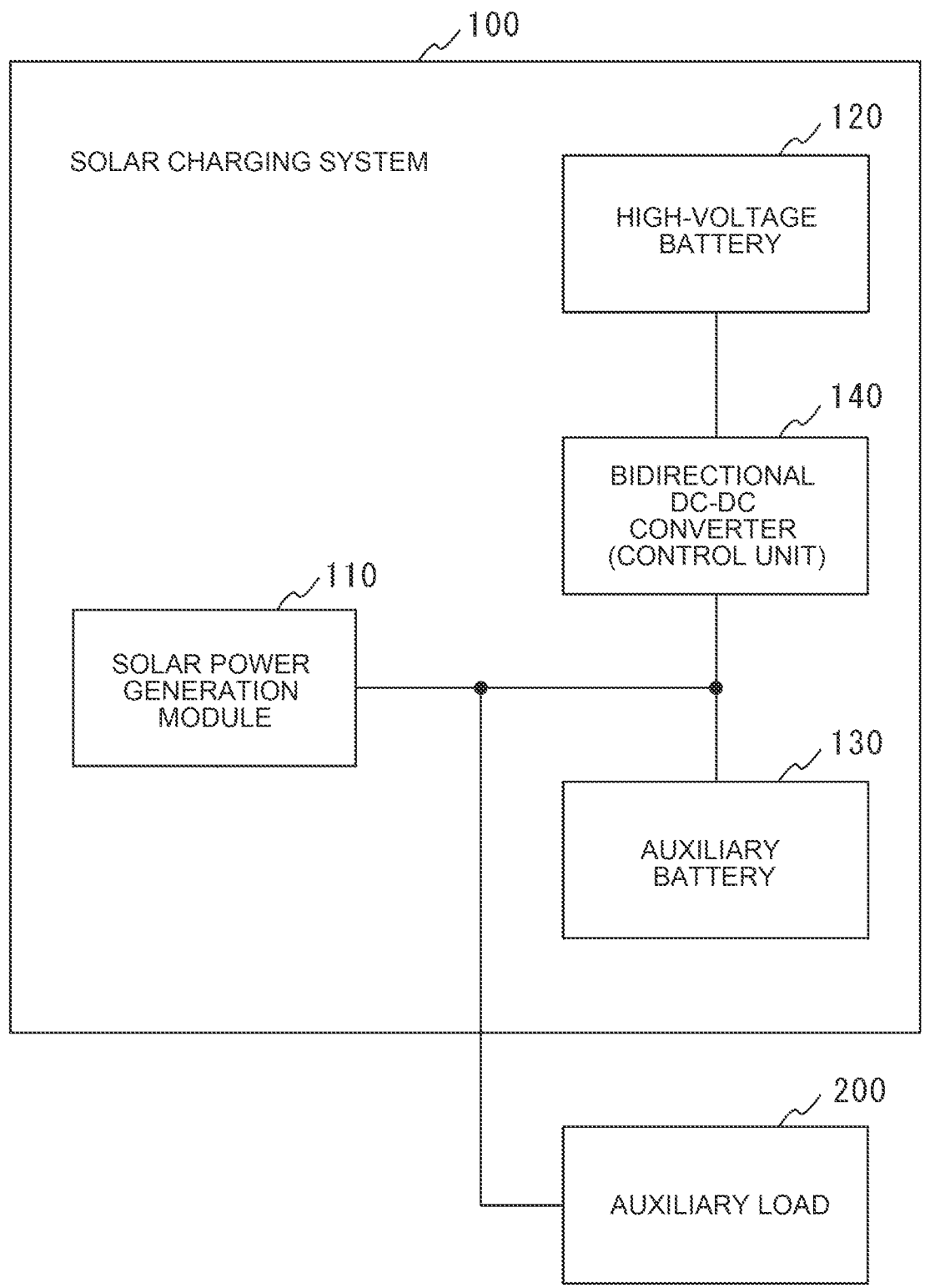
FIG. 1 is a block diagram of a solar charging system and its periphery according to an embodiment of the present disclosure.

FIG. 1 is a block diagram illustrating a schematic configuration of a solar charging system 100 and a peripheral portion thereof according to an embodiment of the present disclosure. The solar charging system 100 illustrated in FIG. 1 includes a solar power generation module 110, a high-voltage battery 120, an auxiliary battery 130, and a bidirectional DC-DC converter 140. In addition, the solar charging system 100 is connected to the auxiliary load 200 so as to be able to supply electric power.

The solar charging system 100 may be mounted on vehicles such as hybrid electric vehicle (HEV), plug-in hybrid electric vehicle (PHEV), and battery electric vehicle (BEV), for example.

The solar power generation module 110 is a power generation device that generates electric power by being irradiated with sunlight, and outputs the generated electric power to the auxiliary battery 130, the auxiliary load 200, and the like connected to the solar power generation module 110. The solar power generation module 110 includes a solar panel, a solar DC-DC converter, a solar control unit, and the like (not shown). A solar panel is an assembly of solar cells. The solar DC-DC converters are configured to generate electric power generated by the solar panel. The solar control unit performs a Max Power Point Tracking (MPPT) control. The generated electric power of the solar panel is calculated from a measured value of a sensor or a measuring instrument (not shown).

The high-voltage battery 120 is a secondary battery configured to be chargeable and dischargeable, such as a lithium-ion battery or a nickel-metal hydride battery. The high-voltage battery 120 is connected to a main device (not shown) for driving the vehicle. The high-voltage battery 120 can supply power necessary for the operation of the main device. Examples of the main equipment include a starter motor and a traveling electric motor. The high-voltage battery 120 is connected to the solar power generation module 110 via the bidirectional DC-DC converter 140 so as to be charged by electric power generated in the solar panel of the solar power generation module 110. The high-voltage battery 120 is connected to the auxiliary battery 130 via the bidirectional DC-DC converter 140 so that the electric power stored therein can be supplied to the auxiliary battery 130. The high-voltage battery 120 is connected to the auxiliary battery 130 via the bidirectional DC-DC converter 140 so that the high-voltage battery 120 is charged by the electric power stored in the auxiliary battery 130. The high-voltage battery 120 is, for example, a driving battery having a rated voltage higher than that of the auxiliary battery 130.

The auxiliary battery 130 is a secondary battery configured to be chargeable and dischargeable, such as a lithium-ion battery or a lead-acid battery. The auxiliary battery 130 can supply power necessary for the operation of the auxiliary load 200 to the auxiliary load 200. The auxiliary battery 130 is connected to the solar power generation module 110 so that the auxiliary battery 130 is charged by the electric power generated in the solar panel of the solar power generation module 110. The auxiliary battery 130 is connected to the high-voltage battery 120 via the bidirectional DC-DC converter 140 so that the auxiliary battery 130 is charged by the electric power stored in the high-voltage battery 120. The auxiliary battery 130 is connected to the high-voltage battery 120 via the bidirectional DC-DC converter 140 so that the electric power stored therein can be supplied to the high-voltage battery 120. The charge amount (storage amount) of the auxiliary battery 130, the current flowing in and out of the auxiliary battery 130, and the like are monitored by a sensor, a measuring instrument, or the like (not shown).

The bidirectional DC-DC converter 140 is a bidirectional power converter capable of converting input power into predetermined-voltage power and outputting the converted power. One end (referred to as the primary) of the bidirectional DC-DC converter 140 is connected to the solar power generation module 110, the auxiliary battery 130, and the auxiliary load 200. The other end of the bidirectional DC-DC converter 140 (referred to as the secondary) is connected to the high-voltage battery 120. The bidirectional DC-DC converter 140 can supply (pump-charge) the electric power outputted from the solar power generation module 110 and the auxiliary battery 130 connected to the primary side to the high-voltage battery 120 connected to the secondary side. In addition, the bidirectional DC-DC converter 140 can feed (pump-out) the electric power of the high-voltage battery 120 connected to the secondary side to the auxiliary battery 130 and the auxiliary load 200 connected to the primary side. At the time of supplying the electric power, the bidirectional DC-DC converter 140 boosts the voltage of the auxiliary battery 130 inputted to the primary side to obtain the voltage outputted from the secondary side (during the boosting operation). At the time of power supply, the voltage of the high-voltage battery 120 input to the secondary side is stepped down to be the output voltage of the primary side (during the step-down operation). Instead of the bidirectional DC-DC converter 140, two unidirectional DC-DC converters may be provided in which the power transfer directions are opposite to each 15 other.

The above-described bidirectional DC-DC converter 140 constitutes a control unit that controls power transfer between the high-voltage battery 120 and the auxiliary battery 130, together with an electronic control unit (not shown) that controls the power converting operation. The control unit can acquire electric power generated by the solar panel of the solar power generation module 110 (solar generated electric power), the amount of electricity stored in the auxiliary battery 130, the current flowing in and out of the auxiliary battery 130, and the like. The control executed by the control unit will be described later. Note that the control unit may be provided as a configuration independent of the bidirectional DC-DC converter 140.

The auxiliary load 200 is a variety of auxiliary devices mounted on the vehicle. The auxiliary load 200 operates by receiving the power generated by the solar power generation module 110 and the power stored in the auxiliary battery 130. Examples of the auxiliary equipment include lighting equipment such as headlamps and indoor lamps, air conditioners such as heaters and air conditioners, and systems for autonomous driving and advanced driving support. The auxiliary load 200 and the auxiliary battery 130 form an "auxiliary system".

Control

Figure 2:
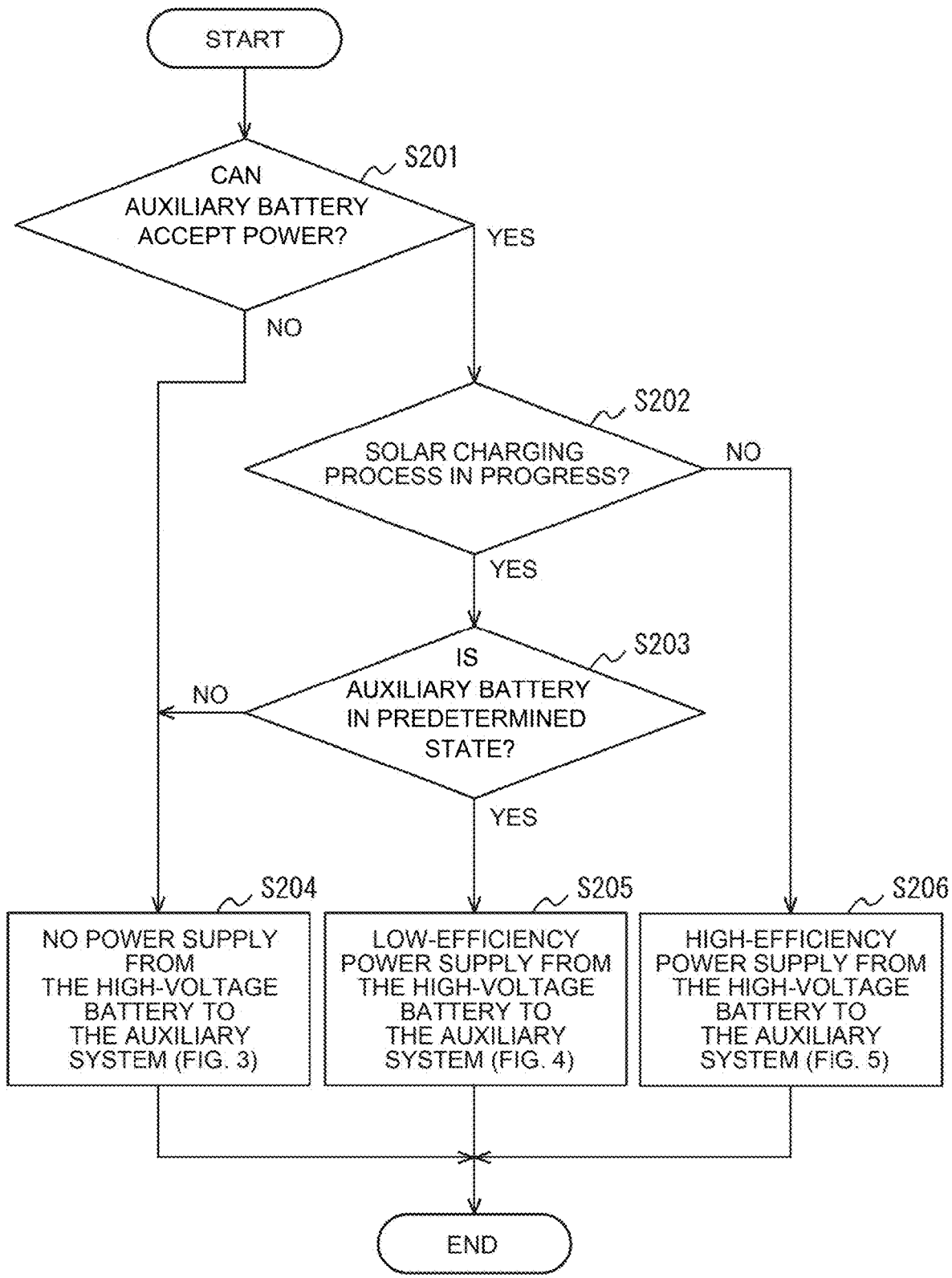
FIG. 2 is a processing flowchart of charging control executed by the solar charging system.
Figure 3:
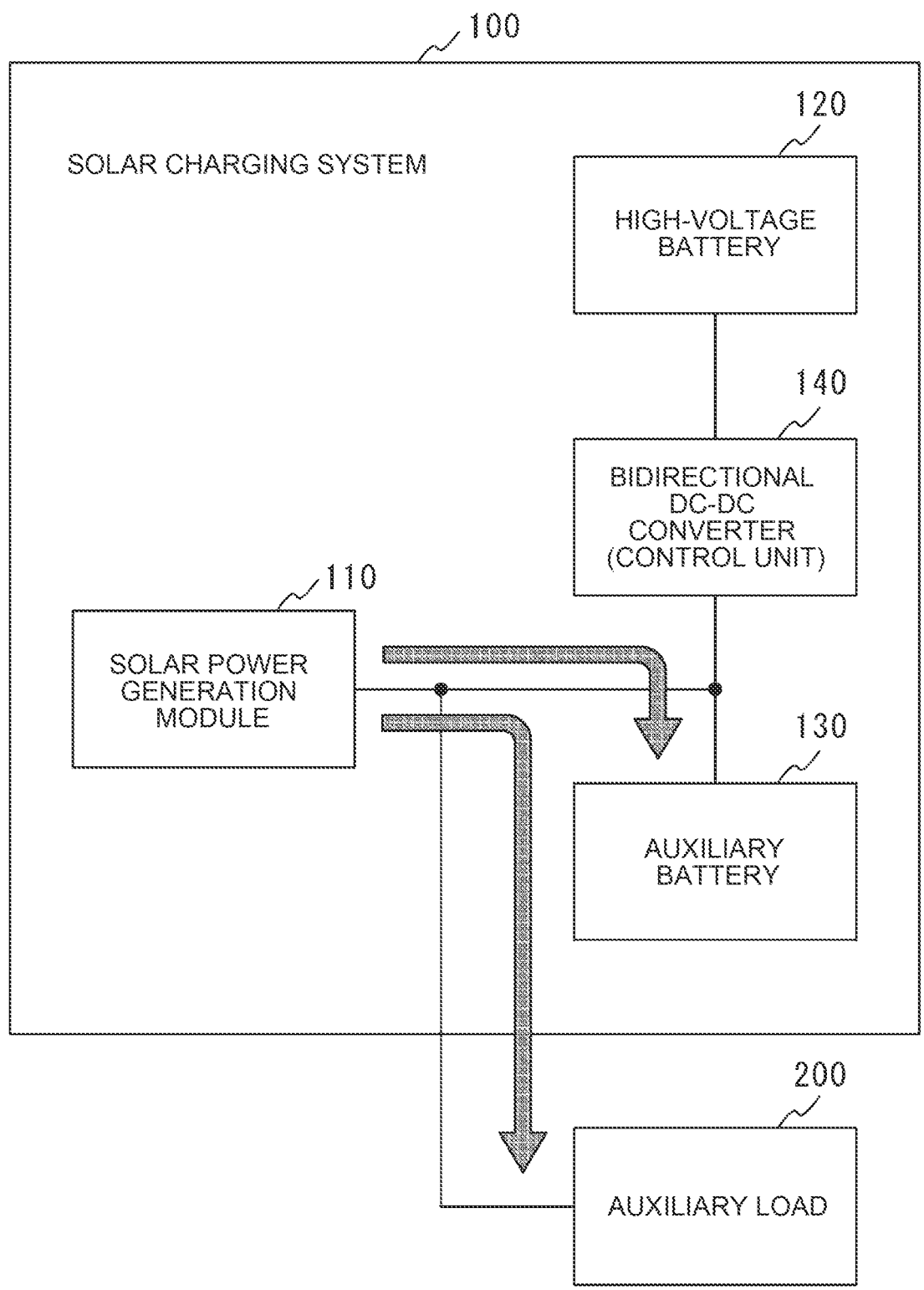
FIG. 3 is a diagram of a power path when the pumping charging process is not performed.
Figure 4:
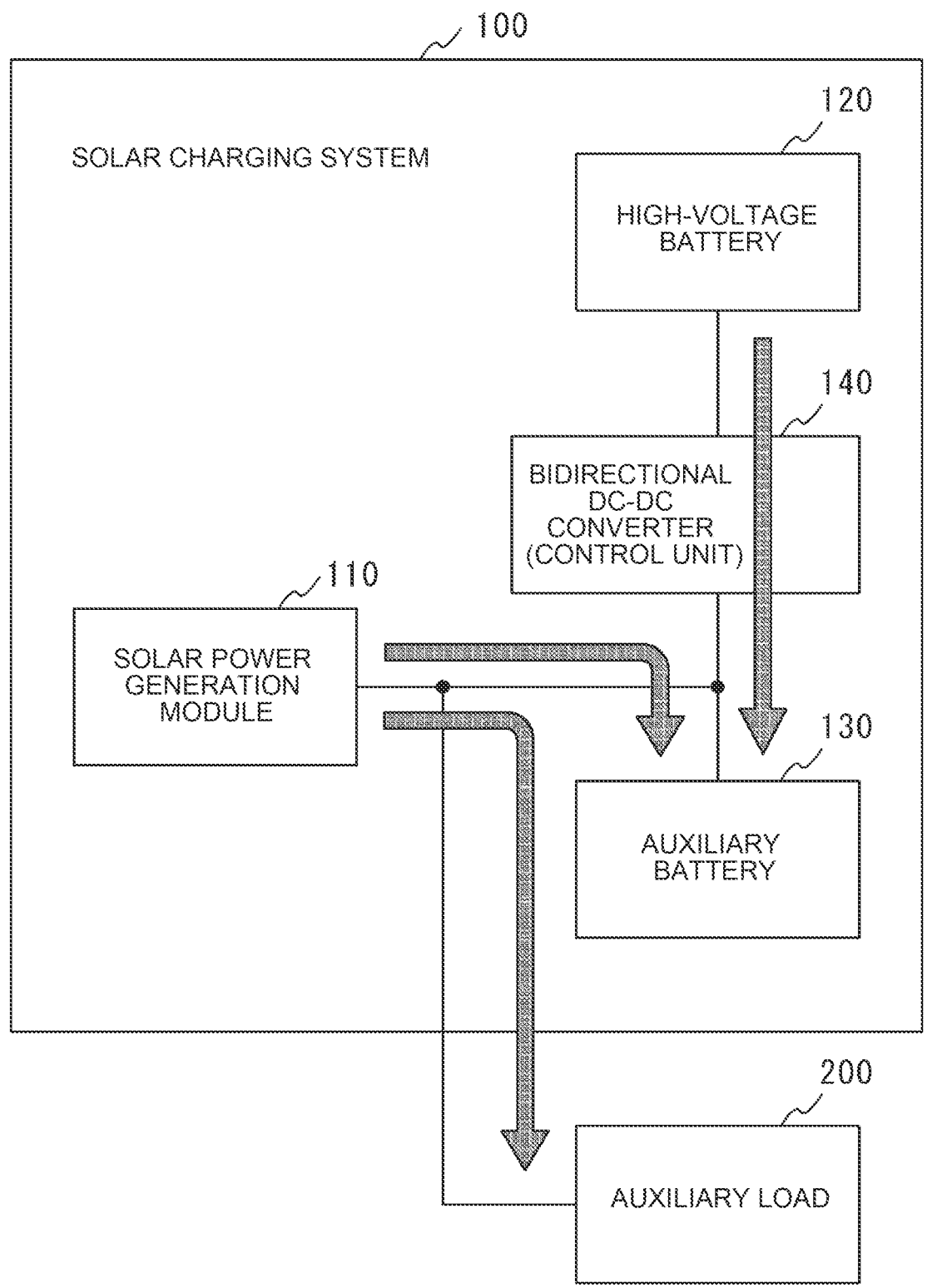
FIG. 4 is a diagram of a power path (with solar power generation) when performing a pumping charge process.
Figure 5:
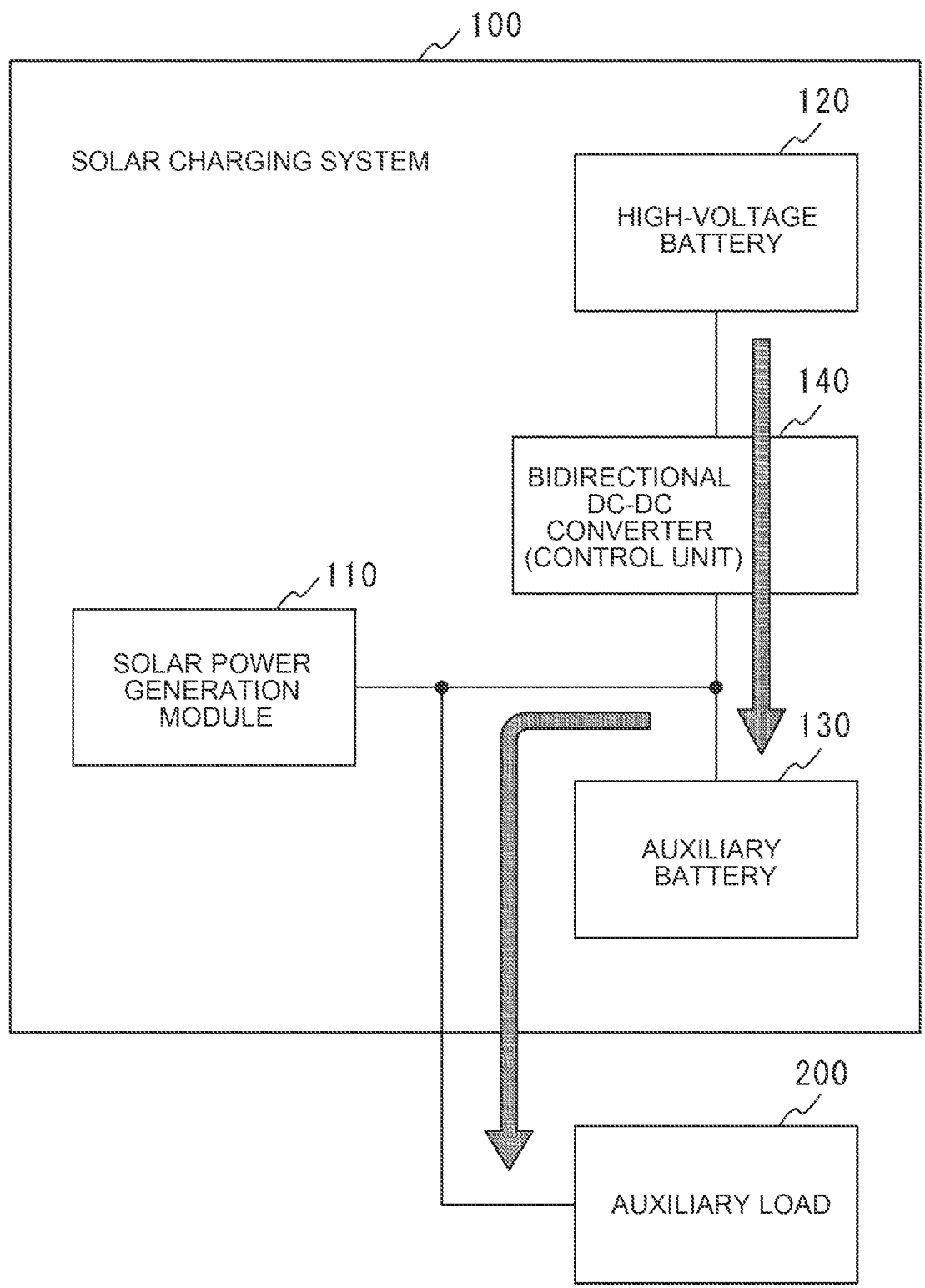
FIG. 5 is a diagram of a power path (without solar power generation) in the case of performing pumped charge processing.

Next, the control performed by the solar charging system 100 according to the present embodiment will be described with reference to FIG. 2 to FIG. 5. FIG. 2 is a flowchart for explaining a procedure of charging control executed by the solar charging system 100. FIG. 3 is a diagram for explaining a power path in a case where there is no power supply from the high-voltage battery 120 to the auxiliary battery 130 and the auxiliary load 200 (auxiliary system). FIG. 4 is a diagram illustrating a power path in a case where there is solar generated power and there is power supply from the high-voltage battery 120 to the auxiliary battery 130 and the auxiliary load 200. FIG. 5 is a diagram illustrating a power path in a case where there is no solar generated power and power is supplied from the high-voltage battery 120 to the auxiliary battery 130 and the auxiliary load 200.

The charge control illustrated in FIG. 2 is started when a pumping charge for transferring electric power from the high-voltage battery 120 to the auxiliary battery 130 is requested.

S201

The solar charging system 100 determines whether the auxiliary battery 130 is capable of accepting power. This determination is made in order to ascertain whether or not the auxiliary battery 130 is in a chargeable state. As an example, the solar charging system 100 determines that the auxiliary battery 130 can accept power when the amount of power stored in the auxiliary battery 130 is smaller than a predetermined value (fully charged state). In addition, when an abnormality such as the temperature of the auxiliary battery 130 being higher than a predetermined value is recognized, the solar charging system 100 determines that the auxiliary battery 130 is unable to accept power. The state of the auxiliary battery 130 is determined based on a physical quantity or the like detected by a sensor, a measuring instrument, or the like.

If the solar charging system 100 determines that the auxiliary battery 130 is capable of accepting power (S201, yes), the process proceeds to S202. On the other hand, if the solar charging system 100 determines that the auxiliary battery 130 is unable to accept power (S201, no), the process proceeds to S204.

S202

The solar charging system 100 determines whether or not the "solar charging process" is currently being executed. This determination is made in order to ascertain whether or not a more efficient pumping charge can be performed. The "solar charging process" is a process of outputting the electric power generated by the solar panel of the solar power generation module 110 to the auxiliary battery 130 and the auxiliary load 200 (auxiliary system). For example, in a case where the solar power generation module 110 already supplies the solar power generation power to the auxiliary battery 130, the power that can be transferred from the high-voltage battery 120 to the auxiliary battery 130 is limited by the solar power generation power, so that there is a possibility that high energy conversion efficiency cannot be obtained.

If the solar charging system 100 determines that the solar charging process is being performed (S202, Yes), the process proceeds to S203. On the other hand, when the solar charging system 100 determines that the solar charging process is not being executed (S202, No), the process proceeds to S206.

S203

The solar charging system 100 determines whether the auxiliary battery 130 is in a predetermined state. This predetermined state refers to a state in which, in the future in which the auxiliary battery 130 continues to receive the supply of the solar generated power from the solar power generation module 110, there is a possibility that the state of the auxiliary battery 130 is in an undesirable state (which affects deterioration). Examples of a situation that is not preferable as a state of the auxiliary battery 130 include a remarkable phenomenon (exhaustion) of the amount of electricity stored in the auxiliary battery 130 and a remarkable decrease in the output voltage of the auxiliary battery 130. Specific examples of the predetermined state include a state in which the amount of electricity stored in the auxiliary battery 130 decreases at a predetermined speed, a state in which the voltage of the auxiliary battery 130 decreases at a predetermined speed, and the like. The solar charging system 100 can determine whether or not the auxiliary battery 130 is in a predetermined state based on the remaining amount of electricity stored in the auxiliary battery 130, the temperature (heat generation), the limit of the inflow/outflow current, the current consumption of the auxiliary load 200, the environmental temperature, and the like.

If the solar charging system 100 determines that the auxiliary battery 130 is in a predetermined condition (S203, Yes), the process proceeds to S205. On the other hand, if the solar charging system 100 determines that the auxiliary battery 130 is not in the predetermined condition (S203, No), the process proceeds to S204.

S204

The solar charging system 100 does not supply power from the high-voltage battery 120 to the auxiliary battery 130 and the auxiliary load 200 (auxiliary system). By this control, only the electric power generated by the solar panel of the solar power generation module 110 is supplied to the auxiliary battery 130 and the auxiliary load 200. The state of power supply from the solar power generation module 110 to the auxiliary system is as shown in FIG. 3. When the solar charging system 100 controls the power supply to the auxiliary system, the present charging control ends.

S205

The solar charging system 100 performs power supply from the high-voltage battery 120 to the auxiliary battery 130 and the auxiliary load 200 (auxiliary system). By this control, electric power generated by the solar panel of the solar power generation module 110 is supplied to the auxiliary battery 130 and the auxiliary load 200. Further, the power of the high-voltage battery 120 is supplied to the auxiliary battery 130 and the auxiliary load 200 for protection of the auxiliary battery 130 regardless of the conversion efficiency of energy (even if the efficiency is low). The state of power supply from the solar power generation module 110 and the high-voltage battery 120 to the auxiliary system is as shown in FIG. 4. When the solar charging system 100 controls the power supply to the auxiliary system, the present charging control ends.

S206

The solar charging system 100 performs power supply from the high-voltage battery 120 to the auxiliary battery 130 and the auxiliary load 200 (auxiliary system). By this control, only the electric power of the high-voltage battery 120 is supplied to the auxiliary battery 130 and the auxiliary load 200 with high energy conversion efficiency (high efficiency). The state of power supply from the high-voltage battery 120 to the auxiliary system is as shown in FIG. 5. When the solar charging system 100 controls the power supply to the auxiliary system, the present charging control ends.

Operations and Effects

As described above, in the solar charging system 100 according to the embodiment of the present disclosure, when power transfer (pumping-out charging process) from the high-voltage battery 120 to the auxiliary system including the auxiliary battery 130 and the auxiliary load 200 is requested, if the solar generated power of the solar power generation module 110 is not supplied to the auxiliary system, the electric power stored in the high-voltage battery 120 is supplied to the auxiliary system.

By this control, a large amount of electric power can be taken out of the high-voltage battery 120 to the auxiliary system. Therefore, in the pumping charge process, the bidirectional DC-DC converter 140 inserted between the high-voltage battery 120 and the auxiliary battery 130 can be more efficiently converted.

Further, in the solar charging system 100 according to the embodiment of the present disclosure, when the pumping-out charging process from the high-voltage battery 120 to the auxiliary system is requested, even if the solar power generated by the solar power generation module 110 has already been supplied to the auxiliary system, if the auxiliary battery 130 is predicted to fall into a state (depletion, low voltage) in which it is not good in the future, the electric power stored in the high-voltage battery 120 is supplied to the auxiliary system.

By this control, although the bidirectional DC-DC converter 140 is inefficient in converting energy, it is possible to suppress the deterioration of the life, performance, and the like of the auxiliary battery 130.

Although an embodiment of the present disclosure has been described above, the present disclosure can be regarded not only as a solar charging system, but also as a charging control method, a program of the method, a computer-readable non-transitory storage medium storing the program, a vehicle including the solar charging system, and the like.

The solar charging system of the present disclosure can be used in a vehicle or the like on which a solar panel is mounted.

What is claimed is:

1. A solar charging system configured to be mounted on a vehicle, the solar charging system comprising:
   a power generation module including a solar panel;
   an auxiliary system including an auxiliary battery that stores power generated by the power generation module, and an auxiliary load to which power is supplied from the auxiliary battery;
   a high-voltage battery used for driving the vehicle; and
   a control unit that is provided between the high-voltage battery and the auxiliary system and that controls power transfer between the high-voltage battery and the auxiliary system, wherein the control unit is configured to
   supply power of the high-voltage battery to the auxiliary system in a case where power transfer from the high-voltage battery to the auxiliary system is requested and in a case where the power generated by the power generation module is not being supplied to the auxiliary system, and
   supply the power of the high-voltage battery to the auxiliary system in a case where the auxiliary battery is in a predetermined state, even in a case where the power generated by the power generation module is being supplied to the auxiliary system, wherein the predetermined state is a state in which a power storage amount of the auxiliary battery decreases at a predetermined speed.

2. A solar charging system configured to be mounted on a vehicle, the solar charging system comprising:
   a power generation module including a solar panel;
   an auxiliary system including an auxiliary battery that stores power generated by the power generation module, and an auxiliary load to which power is supplied from the auxiliary battery;
   a high-voltage battery used for driving the vehicle; and
   a control unit that is provided between the high-voltage battery and the auxiliary system and that controls power transfer between the high-voltage battery and the auxiliary system, wherein the control unit is configured to
   supply power of the high-voltage battery to the auxiliary system in a case where power transfer from the high-voltage battery to the auxiliary system is requested and in a case where the power generated by the power generation module is not being supplied to the auxiliary system, and
   supply the power of the high-voltage battery to the auxiliary system in a case where the auxiliary battery is in a predetermined state, even in a case where the power generated by the power generation module is being supplied to the auxiliary system, wherein the predetermined state is a state in which a voltage of the auxiliary battery decreases at a predetermined speed.

* * * * *